Figure 1:
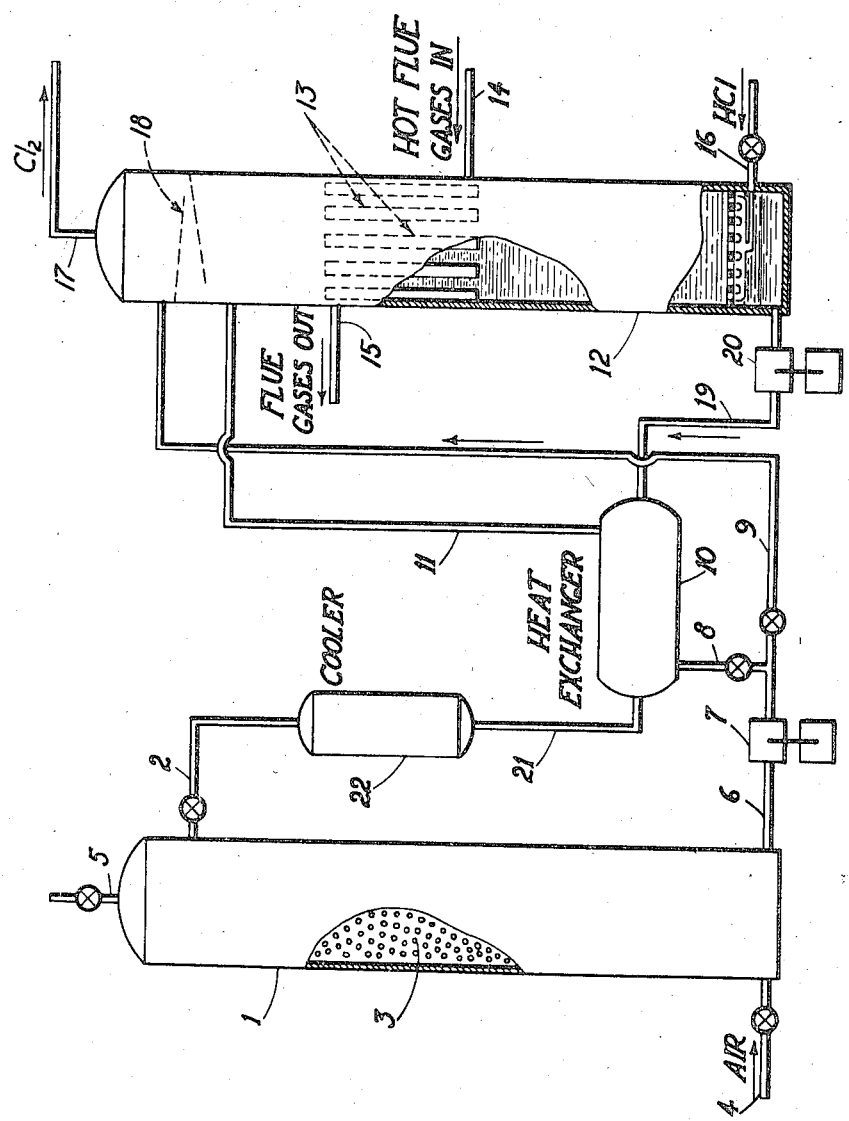

Everett Gorin
INVENTOR

BY Sidney A. Johnson
ATTORNEY

April 15, 1947.   E. GORIN   2,418,930
CHLORINE MANUFACTURE
Filed Oct. 25, 1943   3 Sheets-Sheet 3

Everett Gorin
INVENTOR
BY Sidney A. Johnson
ATTORNEY

UNITED STATES PATENT OFFICE 2,418,930

CHLORINE MANUFACTURE

Everett Gorin, Dallas, Tex., assignor, by mesne assignments, to Socony-Vacuum Oil Company, Incorporated, New York, N. Y., a corporation of New York Application October 25, 1943, Serial No. 507,617

9 Claims. (Cl. 23—219)

This invention relates to the conversion of hydrochloric acid to chlorine. Chlorine is assuming ever increasing importance in both the petroleum and organic chemical industries, where it is widely used as a reagent in the production of such essential materials as butadiene, vinyl chloride, methyl chloride, chlorobenzene and many others. In the majority of these processes hydrochloric acid is produced simultaneously with the desired reaction product. Since there is no available market for the large quantities of hydrochloric acid so produced, the need for an economical method of reconverting hydrochloric acid to chlorine has become apparent.

As disclosed in my copending application, Serial Number 507,616, filed October 25, 1943, entitled "Recovery of halogens" chlorine may be produced from hydrogen chloride, cuprous chloride and oxygen by means of the process involving the three reactions illustrated by the following equations:

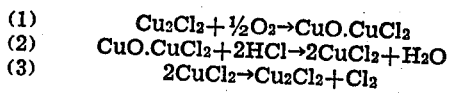

(1)       $Cu_2Cl_2 + \frac{1}{2}O_2 \rightarrow CuO \cdot CuCl_2$
(2)       $CuO \cdot CuCl_2 + 2HCl \rightarrow 2CuCl_2 + H_2O$
(3)       $2CuCl_2 \rightarrow Cu_2Cl_2 + Cl_2$ In the application referred to above, a two stage process was proposed, wherein Reactions 1 and 2 were conducted in the first stage, the second stage being comprised of Reaction 3. I have found that several operational advantages may be obtained by arranging the carrying out of the last two reactions substantially simultaneously in the second stage of the process. The main distinction between the aforementioned copending application and the instant invention lies in their different combinations of the three reaction steps involved, to form the two stage processes. Thus, where the process of the aforementioned copending application combines the oxidation of cuprous chloride to the oxychloride and the neutralization of the oxychloride with hydrogen chloride, the instant application combines the neutralization of the oxychloride and decomposition of the cupric chloride in the second stage.

The primary object of the present invention is the provision of an improved economical method for the conversion of hydrogen chloride to chlorine.

Another object is to provide a method whereby hydrochloric acid is efficiently utilized to produce chlorine on a quantitative basis.

A further object is to provide a method whereby the chlorine produced is free from dilution with air.

Still another object of the invention is to afford a method for the production of chlorine from hydrochloric acid which is continuous in operation.

Still another object is the provision of a process for the production of chlorine which is capable of being operated on a thermally self-sufficient basis.

Essentially the present invention provides a process for the production of chlorine, which involves as the principal steps: (1) the oxidation of cuprous chloride by an oxygen containing gas, to form cupric oxychloride, i. e. stage one; (2) the reaction of the cupric oxychloride with hydrochloric acid gas to form chlorine and reform cuprous chloride, i. e. stage two; (3) the recovery of the chlorine product and; (4) the return of the reformed cuprous chloride to the oxidation step, for recycling through the process.

The invention may best be understood with reference to the drawings, which illustrate diagrammatically three forms of apparatus that may be employed in practicing the invention, although the invention is not to be construed as limited to any particular form of apparatus.

Referring to the drawings, in Figure 1, a salt melt comprising a major portion of cuprous chloride is admitted to the top of packed tower 1, through line 2. The temperature of the melt entering the tower should be within the range of 250° C. to 425° C., although temperatures of from about 350° C. to 400° C. are preferred for greatest efficiency. The melt on entering the tower is dispersed uniformly over the packing 3 and is contacted, as it flows down through the tower, by a countercurrent stream of air, admitted to the bottom of the tower through inlet line 4. The melt, thus contacted by the air, is partially converted to cupric oxychloride. Due to the exothermic nature of the oxidation reaction, the melt heats up as it passes down through the tower. The temperature of the melt leaving the bottom of the tower is maintained below 475° C., and preferably not above 425° C. Waste gases consisting mainly of nitrogen together with some unreacted oxygen are vented from the top of the tower through line 5.

The reacted melt leaving the tower through line 6, provided with a suitable pump 7, is divided into two streams in lines 8 and 9. The melt stream in line 8, passes into the heat exchanger 10, where it is preheated before flowing up through line 11 to enter the neutralization and desorption tower 12 at a point somewhat below the top of the tower. The remainder of the melt in line 9 is admitted at a point close to the top of the tower.

This relatively cool portion of the melt as it descends through the upper portion of the tower serves as a scrubbing agent, condensing any metal halides that may be volatilized and absorbing any hydrogen chloride gas which may pass through the lower portions of the tower unreacted.

The melt descending in the tower passes through the heating zone which is comprised of a series of graphite tubes 13, which are coated with silicon carbide. The tubes are heated by means of hot flue gases which are blown into the unit through line 14. The gases circulate around the tubes and pass out of the heater through the vent 15. The admission of flue gases into the heating zone is regulated so that the melt therein attains a temperature above 425° C. and preferably from 475° C. to 550° C. As the melt descends through the tower, it is contacted by a countercurrent stream of hydrogen chloride, which enters the tower from inlet line 16. For most efficient conversion of hydrogen chloride, the amount thereof admitted to the tower must be controlled so that the mol ratio of the amount of hydrogen chloride entering the tower 12, to the amount of oxygen entering the tower 1 is about 4 to 1. The reaction between the partially oxidized melt and the hydrogen chloride produces chlorine gas and water vapor and reforms cuprous chloride in the melt. The gas pressure resulting from the reaction in the tower, and from the incoming stream of hydrogen chloride, produces a flow of product containing vapors from the top of the tower through outlet line 17. Baffle plates 18 are preferably provided, in the vapor space near the top of the tower, to minimize entrainment of melt particles in the outgoing product stream. The baffle plates are placed in a slightly inclined position to facilitate the downward flow of the melt entering the tower from line 9.

The hot reacted melt is withdrawn from the tower through line 19 and is forced by pump 20 into heat exchanger 10, wherein it gives up some of its heat, by indirect exchange, to the melt flowing through the exchanger from line 8 to line 11. From the exchanger the melt is directed in line 21 to cooler 22, where it is further cooled to the desired temperature of from 350° C. to 400° C., before passing through line 2, from which it re-enters the top of tower 1 for recycling through the process.

The product stream in line 17, comprising a mixture of chlorine gas and water vapor is treated for removal of water and any unreacted hydrogen chloride before being compressed for storage.

Of the prior art methods for producing chlorine the Deacon process has been most widely employed, chiefly because it avoids the formation of by-products such as are present in electrolytic methods. The Deacon process, however, possesses two prominent disadvantages, viz., the chlorine product is always highly diluted with air, thus necessitating expensive separation and recovery treatment thereof, and the problem of maintaining the activity of the catalyst. In the present invention these difficulties are eliminated, since the process is not catalytic and the product is free from dilution with air. An additional feature of my invention resides in the fact that by operating in the manner hereinafter described, it may be carried out on a thermally self-sufficient basis, thereby avoiding the need for an external source of heat in the neutralization-dehalogenation tower, and for expensive heat exchangers capable of withstanding the corrosive action of the hot melt. An apparatus suitable for carrying out the process in this manner is illustrated in Figure 2 of the drawing.

Figure 2:
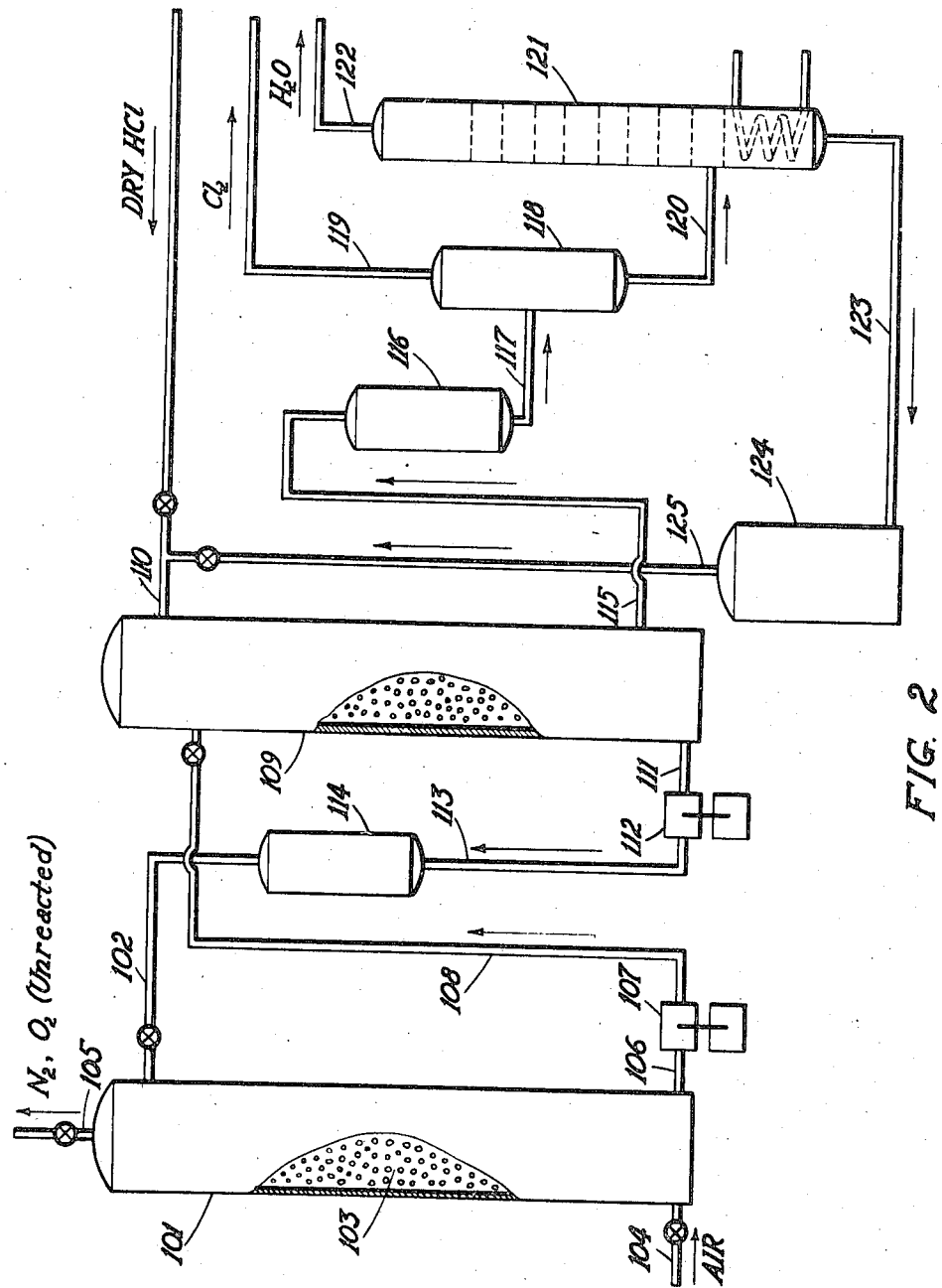

Referring to Figure 2, a salt melt, comprising a major portion of cuprous chloride is admitted to the top of packed tower 101, through line 102. The temperature of the melt entering the tower should be in the neighborhood of 400° C. for the reason to be described hereinafter. The melt on entering the tower is dispersed uniformly over the packing 103 and is contacted as it flows down through the tower by a countercurrent stream of air, which is admitted to the bottom of the tower under pressure through inlet line 104. The melt thus contacted by the air is partially converted to cupric oxychloride. The exothermic nature of the oxidation reaction causes the melt to heat up considerably as it passed down through the tower, but the temperature of the melt at the bottom of the tower should not be allowed to exceed about 475° C. if excessive dissociation of cupric oxychloride at this point is to be avoided. The temperature which the melt obtains in the tower is dependent upon the amount of melt passing through the tower per unit time and the amount of air admitted to the tower neglecting heat losses from the tower. The preferred operating temperature of the tower is within the range of from 400° C. to 475° C. To minimize dissociation of cupric oxychloride, the air pressure in the tower is preferably maintained between 10 and 20 atmospheres. Waste gases consisting mainly of nitrogen together with a small amount of unreacted oxygen are vented from the top of the tower through line 105.

The hot melt leaving the tower 101, through line 106, provided with pump 107, is forced up through line 108, from whence it enters packed tower 109 at a point somewhat below inlet line 110. Dry hydrogen chloride gas, under atmospheric pressure, enters the tower from inlet line 110 and comes into direct contact with the hot melt, the gas and the melt then flowing cocurrently down through the tower. The partially oxidized melt reacts with the hydrogen chloride to produce chlorine gas, water vapor and cuprous chloride according to the reactions of Equations 2 and 3 above. The temperature of the hot melt decreases somewhat as it passes down through the tower. The extent of this temperature drop in the melt is dependent upon the heat losses from the tower and the temperature of the hydrogen chloride gas. Also, the reaction may be slightly endothermic, and some heat might be utilized by the reaction. The temperature in the tower is preferably within the range of from 425° C. to 475° C.

The exothermic heat of reaction in tower 101 is more than sufficient to supply the heat requirements of the reaction in tower 109. In this mode of carrying out the invention the circulating melt is utilized as a heat transfer medium to conduct the heat evolved from the exothermic stage of the process, viz. tower 101, to the substantially thermally neutral stage of the process, viz. tower 109, and careful control is exercised over the rate of circulation of the melt through the system, as well as over the amounts of air and hydrogen chloride admitted to the reaction towers, so that a heat balance is obtained within the system which permits the process to be operated as a thermally self-sufficient unit. It is necessary that the rate of circulation of the melt be rapid enough to insure efficient transfer of the available heat from tower 101 to tower 109. Obviously, too slow a flow of the melt would tend to increase heat losses, due to radiation and conduction through the walls of the reaction towers and from the melt-conducting tubes, since the temperature differentials in the reaction zones would be increased. Hence the process is operated, where extraneous heating is to be avoided, with relatively small temperature differentials in each stage. Since the temperature required in the second stage of the process is in excess of 425° C. for efficient evolution of chlorine, the temperature of the melt entering the first stage should be at least as high as about 400° C. It is necessary also, that the amounts of hydrogen chloride and oxygen reacting with the melt in towers 101 and 109, respectively be in the approximate molecular ratio of 4 to 1. This will prevent material overall changes in the oxychloride content of the melt and will also eliminate the possibility of the "building up" of any one component in the melt. It is evident that large changes in the composition of the melt will have an adverse effect on the heat balance within the system, and it is recommended that the composition of the melt at any given point in the system is maintained substantially constant, i. e., within 5 to 10 percent. A check on the melt composition may be readily obtained by taking off samples of the melt for analysis from any convenient point on the melt-conduction lines. Undesirable variations in the composition may be avoided or the desired values restored at any time by suitable regulation of the amounts of air and hydrogen chloride gas being admitted to the system.

The reacted melt is withdrawn from tower 109, through line 111, and is forced by means of pump 112 up through line 113 into cooler 114, wherein it is cooled to the desired temperature of about 400° C., before passing through line 102 for return to the top of tower 101, and recycling through the process.

The gaseous product stream comprising chlorine, water vapor and a small amount of unreacted hydrogen chloride, leaves the bottom of the tower through line 115, wherein it is conducted to condenser 116. Here the gaseous mixture is cooled sufficiently to condense out an azeotropic hydrogen chloride-water mixture and excess water therefrom. The condensate and the gaseous chlorine are withdrawn from the condenser through line 117 to receiver 118. From the top of the receiver substantially pure chlorine product is discharged through line 119. The condensate is withdrawn through line 120 and sent to fractionator 121. In the fractionator water is removed from the condensate and is distilled off through line 122. The higher boiling hydrogen chloride-water azeotrope is drawn off through line 123, which carries it to evaporator 124. Here the azeotrope is vaporized, and the vaporous mixture conducted off through line 125 to join the fresh hydrogen chloride feed in line 110.

As pointed out above, the melt composition in the thermally self-sufficient form of the process must be controlled within quite narrow limits. On the other hand, relatively large variations in the melt composition are permitted in the first form of the process. However, concentrations of oxychloride above 30 mol percent (on the basis of moles of copper present as the oxychloride per total moles of copper in the melt) are to be avoided since this value represents the approximate saturation point of this component in the melt under the process conditions. It is evident that the rate of chlorine production is somewhat lower when the process is conducted on a thermally self-sufficient basis since the limited changes in the melt composition allowed in this form of the process necessitates a reduction in the amount of gases reacting per unit volume of melt passing through either stage of the process for any given time. Also, the efficiency of the reaction between the partially oxidized melt and the hydrogen chloride will be somewhat decreased because of the lower operating temperatures obtaining in the second stage of the thermally self-sufficient process.

Because the copper halides, which I employ as melts in my invention, have rather high melting points, it is usually desirable to add other halides to the melts in order to lower their melting points. It is necessary that the type of halide added be resistant to the action of oxygen and water vapor at temperatures below 475° C., and also that they be relatively non-volatile. In addition, it is desirable that relatively small additions of these other halides should cause relatively large depressions in the freezing point. Especially useful from this point of view are the alkali metal halides, particularly the chlorides. Certain halides of the heavy metals, such as those of lead, zinc, silver and thallium may be used in place of, or together with, the alkali metal halides.

Although the use of salt melts is particularly advantageous from the standpoint of ease of continuous operation, I do not wish to restrict my invention to the use of melts only. Thus solids such as pumice impregnated with copper halides may be circulated through the various stages of my process. The copper halides themselves need not necessarily be in the molten form in all the stages of the process, particularly where temperatures in the lower range indicated for the oxygen absorption step are used, or where additional salts to lower the melting points of the copper halides are not used. Also, salt mixtures of copper halides having melting points above 425° C. might be used in the solid state in the oxidation stage of the process.

Figure 3:
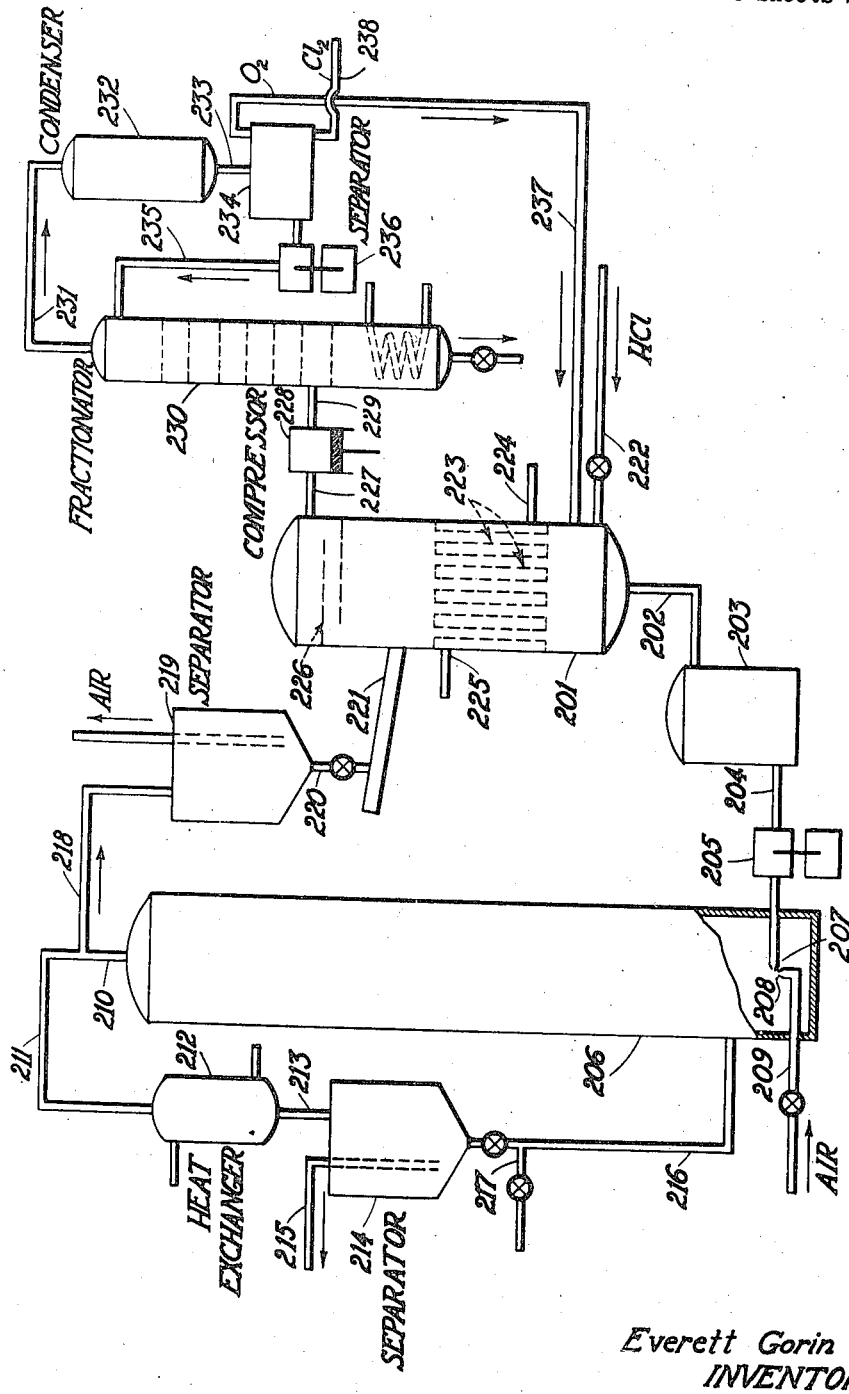

When the copper halides contain only a small amount of potassium or sodium chloride they will be solids at temperatures up to 400° C., or slightly higher, and the process may be advantageously carried out with solid copper halides in the oxidation stage and with a melt in the neutralization and decomposition stage. An advantageous method of operating the process in this manner is illustrated in Figure 3 of the drawings. Referring to Figure 3, hot melt, rich in cuprous chloride and lean in cupric chloride, leaves tower 201 and flows through line 202 to the storage reservoir 203. From the reservoir, the melt is withdrawn through line 204, provided with pump 205, and is delivered into the bottom of the oxidation tower 206. The line 204 is formed with a jet opening 207 placed in a position near the similar jet opening 208 of the air inlet line 209 (as shown). From the jet 208, air is blown across the stream of melt issuing from jet 207, causing the melt to be blown up into the tower in the form of a fine spray. The size of the spray droplets may be regulated by the size of the jet orifices employed. A satisfactory spray size is one which will upon oxidation give solid particles of copper oxychloride which will just pass through a 200 mesh screen. The air preferably is passed into the tower at elevated pressures. A suitable pressure is about 10 atmospheres. The linear rate of flow of air up the tower must be large enough to keep the particles in suspension. For 200 mesh particles the linear rate should be in excess of about 6 cm./sec. The temperature in the oxidation tower should be maintained within the range of 200° C. to 400° C. and preferably between 350° C. and 400° C. The suspended particles are carried to the top of the tower by the air, and the air-particle mixture leaves the tower through line 210. The particles of cuprous chloride are incompletely oxidized in one pass through the tower, and it is therefore convenient to recycle a portion of them. The recycle ratio will depend upon the contact time of the air in the tower, the lower the contact time the larger the ratio. Since the oxidation reaction is exothermic, the temperature of the tower may be controlled by cooling the recycle particles before returning them to the reactor. Thus a suitable portion of the effluent from the reactor in line 210 is conducted off in line 211, which carries it to the heat exchanger 212, where its temperature may be lowered by from 5° C. to 25° C. if necessary. The mixture leaves the exchanger through line 213, which conducts it to the cyclone separator 214, in which the solid particles are separated from the air. The air is expelled through the vent 215. The copper chloride particles are returned to the tower through line 216. A supplementary supply of air may be added through line 217 to aerate the particles and facilitate their flow back to the reactor.

The non-recycle portion of the particle-air mixture emitting from the tower in line 210 is tapped off through line 218 and is sent to the cyclone separator 219, where the particles are separated from the air. The oxidized particles are withdrawn from the separator through line 220, from whence they enter the feeder 221, which in turn delivers them to the top of the neutralization and dechlorination tower 201. The entering temperature range of the particles at the top of tower 201 is from 300° C. to 400° C., with temperatures from 350° C. to 400° C. being preferred. In this latter temperature range, loss of copper chloride by volatilization, and of hydrogen chloride by an incomplete neutralization reaction, through the top of tower 201 is negligible. Hydrogen chloride gas enters at the bottom of tower 201 from line 222. The linear rate of flow of the hydrogen chloride gas upwards through the tower is such that the copper oxychloride particles are able to fall through the tower countercurrent to the gas stream. The predominant reaction occurring in the top section of the tower is the exothermic neutralization of the oxychloride according to Equation 2 above. The exothermic heat of this reaction causes the particles to heat up rapidly to a point where chlorine is evolved by the endothermic Reaction 3 above. To compensate for the heat lost from the system due to the evolution of chlorine, heat is supplied to the central portion of the tower by means of silicon coated graphite tubes 223, around which is circulated hot flue gases which enter the tower through line 224 and which are vented through line 225. The amount of flue gases admitted to the tower should be controlled so that a temperature within the range of from 425° C. to 600° C. is maintained in the heated portion of the tower. The preferred operating temperature, however, is from 475° C. to 550° C. Baffle plates 226 are preferably provided in the vapor space in the upper portion of the tower to minimize entrainment of salt particles in the effluent product stream in line 227.

The copper halide particles on being dechlorinated will melt because of the lowering of the melting point due to the conversion of the oxychloride back to cuprous chloride and also because of the higher temperature in the heating portion of the tower. The cuprous chloride will collect as a melt in the bottom of the tower. The hydrogen chloride gas, which may be either cold or slightly preheated on entering the tower, is heated to reaction temperature by the countercurrent scrubbing action of the hot melt descending in the tower. The melt is simultaneously cooled to a temperature of about 375° C. which is advantageous for entering the oxidation tower 206.

A small amount of oxygen desorbed from the oxychloride in tower 201 will not be fixed in the cooler portion of the tower, and the product stream issuing through line 227 comprises water vapor, chlorine and this small amount of oxygen. In line 227 the gases are directed to the compressor 228, from which they are withdrawn in line 229 and sent to the fractionator 230. The water is withdrawn from the bottom of the fractionator and the chlorine-oxygen gaseous mixture is taken off overhead and directed in line 231 to condenser 232. Here the chlorine gas is liquefied and the liquid chlorine and the oxygen are withdrawn in line 233 and sent to the separator 234. From the separator some liquid chlorine is withdrawn in line 235, provided with pump 236, and returned to the top of the fractionator for chlorine reflux. Oxygen from the separator is recycled to the bottom of tower 201 by way of line 237. The pure chlorine product flows from the separator to storage (not shown) in line 238.

In describing my invention, as illustrated in Figures 1 and 2, I have indicated that the temperature of the melt in the oxidation tower of Figure 1 should be maintained within the range of from 250° C. to 475° C. This is because it is impractical to use salt mixtures having melting points below 250° C. because of their necessarily low copper halide content, while at temperatures above 475° C. appreciable dissociation of the cupric oxychloride will take place. In Figure 3, however, the temperature of the oxidation tower can be as low as 200° C. since the copper halides need not be kept in a molten condition, and since the reaction will proceed at an appreciable rate down to temperatures of this order, although higher temperatures are preferred. In the neutralization and dechlorination towers of both Figure 1 and Figure 3 the preferred temperature range was indicated as from 475° C. to 550° C. This is the optimum temperature range for the neutralization - dehalogenation reaction, since below 500° C. the reaction rate falls off considerably, although lower temperatures, above 425° C., may be used. On the other hand, above 600° C. excessive amounts of vaporized melt are entrained in the gaseous product stream and temperatures above this value are not recommended.

Moderate air pressures generally give rapid and efficient absorption of oxygen in the melt in the oxidation stage of my process, although operation at atmospheric pressure gives satisfactory results. Air pressures between 1 and 20 atmospheres may be employed, although with the thermally self-sufficient form of the invention elevated pressures, from 10 to 20 atmospheres, are particularly desirable as pointed out above.

In the thermally self-sufficient form of the invention I have illustrated the temperature of the melt entering tower 101 as being in the neighborhood of 400° C. As hereinbefore stated, if the temperature of the melt is much below 400° C. at this point it may not be at a sufficiently high temperature on entering tower 109 to react with the hydrogen chloride and liberate chlorine. The temperature which the melt must reach before leaving tower 101 is about 475° C., since the halogenation-dehalogenation reaction in tower 109 is not efficient below 450° C. The contacting of the melt in tower 109, by a cocurrent rather than a countercurrent stream of hydrogen chloride, as in Figures 1 and 3, is preferred because the temperature of the melt is highest near the top of the tower, and the reaction between the melt and gas is most efficient at the higher end of the temperature range indicated.

In the description of my invention several methods have been illustrated for the provision of efficient contact between the copper chlorides and the reacting gases, for example, in the oxidation towers of Figures 1 and 2 the melt was dispersed over a contact mass in a gas stream. In Figure 3, on the other hand, the copper chlorides were diffused in the form of a fine spray in admixture with air. It is to be understood that other methods of contacting the reacting gases with the halides may be satisfactorily employed and that such other methods are wholly within the scope of this invention.

Throughout the preceding description of my invention I have referred to the compound formed by the oxidation of cuprous chloride with an oxygen containing gas, as cupric oxychloride, and have ascribed to it the formula $CuCl_2.CuO$. Under the reaction conditions used this seems to be the compound formed. Whether or not this is the exact structure of the compound formed is immaterial to the process of the invention. Throughout the specification and claims by the term "cupric oxychloride," I refer to the partially oxidized cuprous chloride melt obtained by heating cuprous chloride in contact with air, and containing up to one mole of oxygen per two moles of cuprous chloride.

The following experimental example will serve to further illustrate the mode of operation of my invention as described in connection with Figure 3 of the drawings.

*Example*

A melt containing 86.0 mol percent of cuprous chloride, 13.0 mol percent of cupric chloride and 1 mol percent of copper oxide was forced into an oxidation tower in the form of a spray at 400° C. The dispersion of the spray was regulated so that the average diameter of the particles was about 0.1 mm. The linear velocity of air through the column was maintained at 12 cm./sec.

Air was entered into the bottom of the tower at 5 atmospheres pressure. The air was passed through the tower at an actual contact time of 5.0 seconds, or at 2.5 seconds contact time referred to air at standard conditions. 75 percent of the oxygen was absorbed from the air in each pass through the tower. 6.5 percent of the total copper was oxidized to the oxychloride in each pass through the tower.

The temperature of the solid particles passing through the top of the tower was approximately 385° C. 1/6 of the the stream was passed through the heat exchanger and cooled to approximately 375° C. The particles were separated from the air and recycled to the oxidation tower. The remaining portion of the effluent stream from the tower was tapped off through a cyclone separator and fed to a chlorine generating tower of the type described hereinbefore in connection with Figure 3. The composition of the feed entering the dechlorination tower was 60 mol percent of the copper as the oxychloride, 13 mol percent as cupric chloride and 27 mol percent as cuprous chloride. The mixture was fed to the top of the tower at 375° C., while a maximum temperature of 525° C. was attained over the central portion of the tower.

A total of 58 mols of hydrogen chloride was fed to the bottom of the dechlorination tower per 100 mols of copper fed to the tower. The hydrogen chloride was preheated to 150° C. before being fed to the tower. The melt leaving the generating tower was cooled by the ascending hydrogen chloride to a temperature of about 400° C.

The linear velocity of the hydrogen chloride stream passing up the tower is maintained at 3.5 cm./sec.

The effluent vapors leaving the chlorine generator contained 29 mols $H_2O$, 29 mols of chlorine and 4 mols of $O_2$ per 100 mols of copper entering the chlorine generating tower.

Other examples illustrating the oxidation and chlorination of cuprous chloride melts by means of air and hydrogen chloride gas, and the subsequent thermal decomposition of the melts to form chlorine, have been set forth in my copending application, Serial Number 507,616, filed October 25, 1943, entitled "Recovery of halogens."

While my invention has been described in connection with the preferred manner of carrying out the process and with preferred forms of apparatus, it is to be understood that the invention is not restricted to the specific modifications herein described and illustrated, but is intended to include such modifications and variations of the method and apparatus which fall within the scope of the appended claims.

I claim:

1. A process for the production of chlorine from hydrogen chloride which comprises (1) continuously circulating a contact mass comprising at least one metallic chloride a major portion of which is cuprous chloride in contact with an oxygen containing gas through a reaction zone while maintaining a temperature within the range of from 200° C. to 475° C. and a pressure of from 1 to 20 atmospheres to form cupric oxychloride (2) withdrawing the contact mass containing cupric oxychloride from the reaction zone and circulating it to a second reaction zone, (3) continuously circulating the mass through the second reaction zone in contact with hydrogen chloride and maintaining a temperature not above 600° C. but at least as high as 475° C. for at least a portion of its residence time in the second reaction zone whereby the cupric oxychloride and hydrogen chloride react to form chlorine gas, water vapor and cuprous chloride, (4) recovering the evolved chlorine and (5) withdrawing the contact mass from the second reaction zone and continuously recirculating it to the first reaction zone.

2. A process for the production of chlorine from hydrogen chloride which comprises (1) continuously circulating a contact mass comprising at least one metallic chloride a major portion of which is cuprous chloride in contact with an oxygen containing gas through a reaction zone while maintaining a temperature within the range of from 200° C. to 475° C. and a pressure of from 10 to 20 atmospheres to form cupric oxychloride (2) withdrawing the contact mass containing cupric oxychloride from the reaction zone and circulating it to a second reaction zone, (3) continuously circulating the mass through the second reaction zone in contact with hydrogen chloride and maintaining a temperature not above 600° C. but at least as high as 475° C. for at least a portion of its residence time in the second reaction zone whereby the cupric oxychloride and hydrogen chloride react to form chlorine gas, water vapor and cuprous chloride, (4) recovering the evolved chlorine and (5) withdrawing the contact mass from the second reaction zone and continuously recirculating it to the first reaction zone.

3. A process for the production of chlorine from hydrogen chloride which comprises (1) continuously circulating a contact mass comprising at least one metallic chloride a major portion of which is cuprous chloride in contact with an oxygen containing gas through a reaction zone while maintaining a temperature within the range of from 200° C. to 475° C. and a pressure of from 1 to 20 atmospheres to form cupric oxychloride (2) withdrawing the contact mass containing cupric oxychloride from the reaction zone and circulating it to a second reaction zone, (3) continuously circulating the mass through the second reaction zone in contact with hydrogen chloride and maintaining a temperature between 475° C. and 600° C. in the second reaction zone whereby the cupric oxychloride and hydrogen chloride react to form chlorine gas, water vapor and cuprous chloride, (4) recovering the evolved chlorine and (5) withdrawing the contact mass from the second reaction zone and continuously recirculating it to the first reaction zone.

4. A process for the production of chlorine from hydrogen chloride which comprises (1) continuously circulating a contact mass comprising at least one metallic chloride a major portion of which is cuprous chloride in contact with an oxygen containing gas through a reaction zone while maintaining a temperature within the range of from 350° C. to 400° C. and a pressure of from 1 to 20 atmospheres to form cupric oxychloride (2) withdrawing the contact mass containing cupric oxychloride from the reaction zone and circulating it to a second reaction zone, (3) continuously circulating the mass through the second reaction zone in contact with hydrogen chloride and maintaining a temperature between 475° C. and 550° C. in the second reaction zone whereby the cupric oxychloride and hydrogen chloride react to form chlorine gas, water vapor and cuprous chloride, (4) recovering the evolved chlorine and (5) withdrawing the contact mass from the second reaction zone and continuously recirculating it to the first reaction zone.

5. A process for the production of chlorine from hydrogen chloride which comprises (1) continuously circulating a melt comprising a major proportion of cuprous chloride in contact with an oxygen containing gas through a reaction zone while maintaining a temperature within the range of from 250° C. to 475° C. and a pressure of from 1 to 20 atmospheres to form cupric oxychloride (2) withdrawing the melt containing cupric oxychloride from the reaction zone and circulating it to a second reaction zone, (3) continuously circulating the melt through the second reaction zone in contact with hydrogen chloride and maintaining a temperature not above 600° C. but at least as high as 475° C. for at least a portion of its residence time in the second reaction zone whereby the cupric oxychloride and hydrogen chloride react to form chlorine gas, water vapor and cuprous chloride, (4) recovering the evolved chlorine and (5) withdrawing the melt from the second reaction zone and continuously recirculating it to the first reaction zone.

6. A process for the production of chlorine from hydrogen chloride which comprises (1) continuously circulating a salt melt comprising a major proportion of cuprous chloride and a minor proportion of an alkali metal chloride in contact with an oxygen containing gas through a reaction zone while maintaining a temperature within the range of from 250° C. to 475° C. and a pressure of from 1 to 20 atmospheres to form cupric oxychloride (2) withdrawing the melt containing cupric oxychloride from the reaction zone and circulating it to a second reaction zone, (3) continuously circulating the melt through the second reaction zone in contact with hydrogen chloride and maintaining a temperature not above 600° C. but at least as high as 475° C. for at least a portion of its residence time in the second reaction zone whereby the cupric oxychloride and hydrogen chloride react to form chlorine gas, water vapor and cuprous chloride, (4) recovering the evolved chlorine and (5) withdrawing the melt from the second reaction zone and continuously recirculating it to the first reaction zone.

7. A process for the production of chlorine from hydrogen chloride which comprises (1) continuously circulating a salt melt comprising a major proportion of cuprous chloride and a minor proportion of potassium chloride in contact with an oxygen containing gas through a reaction zone while maintaining a temperature within the range of from 250° C. to 475° C. and a pressure of from 1 to 20 atmospheres to form cuprous chloride (2) withdrawing the melt containing cupric oxychloride from the reaction zone and circulating it to a second reaction zone, (3) continuously circulating the melt through the second reaction zone in contact with hydrogen chloride and maintaining a temperature not above 600° C. but at least as high as 475° C. for at least a portion of its residence time in the second reaction zone whereby the cupric oxychloride and hydrogen chloride react to form chlorine gas, water vapor and cuprous chloride, (4) recovering the evolved chlorine and (5) withdrawing the melt from the second reaction zone and continuously recirculating it to the first reaction zone.

8. A process for the production of chlorine from hydrogen chloride which comprises (1) continuously circulating a salt melt comprising a major proportion of cuprous chloride and a minor proportion of potassium chloride in contact with an oxygen containing gas through a reaction zone while maintaining a temperature within the range of from 350° C. to 400° C. and a pressure of from 1 to 20 atmospheres to form cuprous chloride (2) withdrawing the melt containing cupric oxychloride from the reaction zone and circulating it to a second reaction zone, (3) continuously circulating the mass through the second reaction zone in contact with hydrogen chloride and maintaining a temperature between 475° C. and 550° C. in the second reaction zone whereby the cupric oxychloride and hydrogen chloride react to form chlorine gas, water vapor and cuprous chloride, (4) recovering the evolved chlorine and (5) withdrawing the melt from the second reaction zone and continuously recirculating it to the first reaction zone.

9. A process for the conversion of hydrogen chloride to chlorine which comprises (1) continuously introducing a salt melt comprising a major proportion of cuprous chloride and a minor proportion of an alkali metal chloride to a reaction zone at a temperature of from about 350° C. to about 400° C. (2) contacting the circulating melt in said reaction zone with a countercurrent stream of a free oxygen containing gas while maintaining a pressure of from 10 to 20 atmospheres to form cupric oxychloride and controlling the reaction so that the melt leaves the reaction zone at a temperature of about 475° C., (3) continuously withdrawing the melt from the reaction zone and circulating it directly to a second reaction zone, (4) introducing the melt into the second reaction zone at a temperature of about 475° C. and cocurrently contacting the melt therein with hydrogen chloride to form chlorine and water vapor and to reform cuprous chloride in the melt, (5) controlling the reaction in the second reaction zone so that the temperature of the melt does not fall below about 425° C., (6) recovering the chlorine and (7) continuously recirculating the melt withdrawn from the second reaction zone to the first reaction zone.

EVERETT GORIN.

REFERENCES CITED

The following references are of record in the file of this patent:

UNITED STATES PATENTS

| Number | Name | Date |
| --- | --- | --- |
| 2,280,673 | Thomas | April 21, 1942 |

FOREIGN PATENTS

| Number | Country | Date |
| --- | --- | --- |
| 5 | British | 1864 |
| 3,171 | British | 1866 |

OTHER REFERENCES

Lunge, Sulfuric Acid and Alkali, vol. III, Gurney & Jackson, London 1911, pages 438–440.

Rideal and Taylor, Catalysts in Theory and Practice, MacMillan, London 1926, page 183.